Jan. 18, 1927.
R. B. BUKOLT
1,614,823
ROLLER BEARING
Filed July 20, 1925
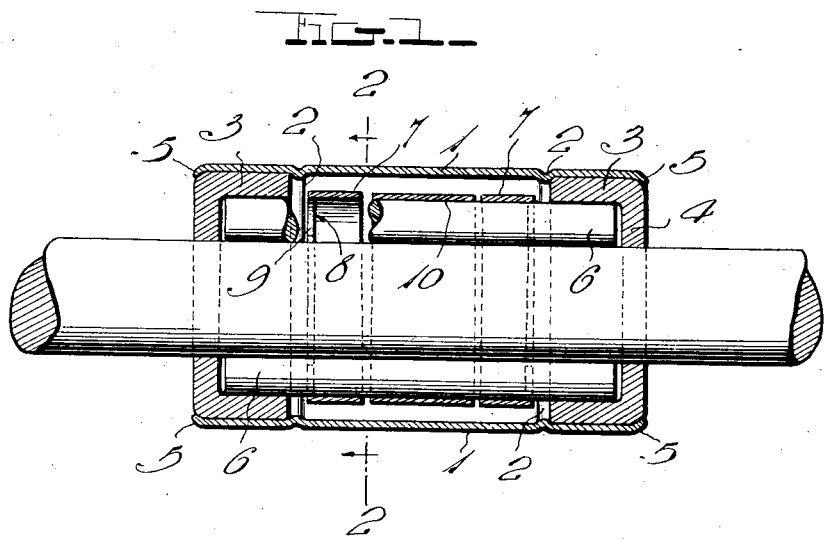
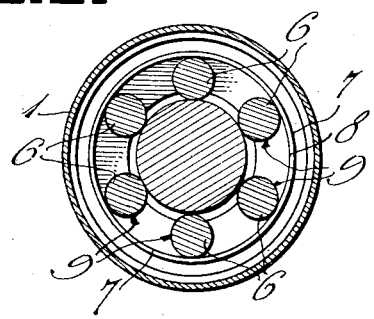
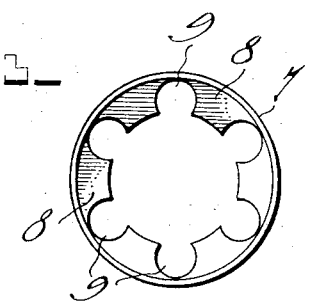
Witness
H. Woodard
Inventor
R. B. Bukolt
By
Attorneys Patented Jan. 18, 1927.

1,614,823

UNITED STATES PATENT OFFICE.

ROMAN B. BUKOLT, OF STEVENS POINT, WISCONSIN.

ROLLER BEARING.

Application filed July 20, 1925. Serial No. 44,846.

My invention relates to improvements in roller bearings and has reference more particularly to a type well designed for use in connection with children's coaster wagons, scooters and the like, although the invention is by no means restricted to this field of use, but may be employed wherever desirable and may of course be constructed in different sizes, as occasion may demand.

One object of the invention is to provide an exceptionally simple and inexpensive, yet a highly efficient and desirable bearing.

A further aim is to provide a unique association of parts, in which all members of the bearing are held in assembled relation prior to installing such bearing, so that there is no danger of any parts becoming lost and ease of installation is insured.

With the foregoing in view, the invention resides in the novel subject matter hereinafter described and claimed, the description being supplemented by the accompanying drawing.

Figure 1 is a longitudinal sectional view through a bearing constructed in accordance with my invention.

Figure 2 is a transverse sectional view on line 2—2 of Fig. 1.

Figure 3 is a side elevation of one of the roller spacing and retaining rings.

In the drawing above briefly described, the numeral 1 designates an elongated cylindrical sleeve formed of relatively light metal and having inwardly stamped circumferential portions spaced inwardly from its extremities and constituting internal ribs 2. Fitting snugly within the end portions of the sleeve 1, are two race rings 3 formed of relatively heavy metal and whose outer edges are provided with inwardly projecting continuous flanges 4, each ring and its flange being preferably formed by stamping a single metal blank into L-shape in transverse section. The inner edges of the rings 3 abut the ribs 2, and the extremities of the sleeve 1 are inwardly swaged as indicated at 5, at the outer edges of said rings, whereby to hold them seated against the aforesaid ribs.

Circumferentially spaced bearing rollers 6 contact with the inner sides of the race rings 3 and have their ends disposed in abutting relation with the flanges 4, and surrounding these rollers, adjacent the rings 3, are two additional rings 7 having inwardly projecting flanges 8, said flanges being formed with notches 9 through which the rollers 6 pass. Preferably, each ring 7 and its flange 8 are stamped from a single metal blank for easy and inexpensive manufacture. These rings are held in spaced relation, by a sheet metal spacing sleeve 10 which surrounds the rollers 6.

It will be seen from the foregoing, that the construction provided is exceptionally simple and inexpensive, yet that it will be efficient and in every way desirable. The rings 3 are held against movement from the sleeve 1, by the swaging 5, and the rollers 6 are held in properly spaced relation by the notches 9 of the flanges 8, so that the bearing is in the form of a complete unit, ready for easy insertion, and there is no danger of losing any parts, when the bearings are held in stock, when they are being shipped, or when installing.

Excellent results have been obtained from the details disclosed and they are therefore preferably followed, but within the scope of the invention as claimed, minor changes may of course be made.

I claim:—

1. In a roller bearing, a light metal cylindrical sleeve having inwardly stamped circumferential portions spaced inwardly from its extremities and forming internal ribs, and a pair of heavy metal roller-engaging race rings fitting entirely within the end portions of said sleeve with their inner edges abutting said ribs, the extremities of said sleeve being swaged inwardly at the outer edges of the rings to secure the latter in place against said ribs whereby the rings stiffen and reinforce the sleeve.

2. An assembled roller bearing unit comprising an outer casing in the form of a light metal sleeve of uniform cylindrical shape having at points spaced inwardly from its ends circumferential portions stamped inwardly and forming internal annular ribs, a pair of heavy metal roller-engaging race rings fitted entirely within the ends of the sleeve with their inner edges abutting said ribs, the extremities of the sleeve being swaged inwardly at the outer edges of the rings to secure the latter in position, said rings having at their outer edges inwardly projecting continuous flanges, a plurality of circumferentially spaced rollers engaging the inner sides of the race rings and having their ends in abutting relation to the ring flanges, a centrally arranged light metal spacing ring surrounding the rollers, and roller-positioning rings between the ends of the spacing ring and the ribs and formed at their outer ends with inwardly projecting flanges, the latter having spaced substantially circular notches to receive and hold the rollers, said spacing and roller-positioning rings being of uniform size and of less diameter than the sleeve to provide a lubricant chamber.

In testimony whereof I have hereunto affixed my signature.

ROMAN B. BUKOLT.